United States Patent [19]

Harrison et al.

[11] 3,725,427
[45] Apr. 3, 1973

[54] CERTAIN 2,4-DIMETHYL-5-CARBOXAMIDO-THIAZOLES

[75] Inventors: William A. Harrison; Marshall Kulka, both of Guelph, Ontario, Canada

[73] Assignee: Uniroyal Ltd., Montreal, Quebec, Canada

[22] Filed: May 1, 1970

[21] Appl. No.: 33,921

Related U.S. Application Data

[62] Division of Ser. No. 599,734, Dec. 7, 1966, Pat. No. 3,547,917.

[52] U.S. Cl. .............................................. 260/302 R
[51] Int. Cl. .............................................. C07d 91/32
[58] Field of Search .............................. 260/302 R

[56] References Cited

OTHER PUBLICATIONS

Lebedeva et al. Chem. Abstracts, 56:12871 (1961)

Primary Examiner—Alex Mazel
Assistant Examiner—R. J. Gallagher
Attorney—Willard R. Sprowls

[57] ABSTRACT

This invention pertains to 2,4-dimethylthiazole-5-carboxamides, which have utility as fungicides and plant growth regulators. These compounds are prepared by the reaction of alpha-halo ketone derivatives with thioamides.

3 Claims, No Drawings

CERTAIN 2,4-DIMETHYL-5-CARBOXAMIDO-THIAZOLES

This application is a division of Kulka et al. pending application Ser. No. 599,734, filed Dec. 7, 1966, now U.S. Pat. No. 3,547,917.

This invention relates to new chemicals and methods for their preparation, more specifically, the invention discloses two classes of thiazolecarboxamide compounds, namely, 2-aminothiazole (I) derivatives and 2-alkylthiazole (II) derivatives, which may be represented by the following formulas:

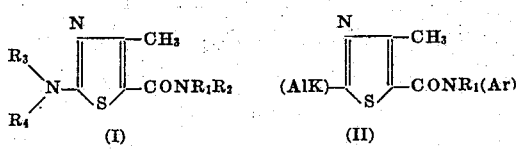

$R_1$, $R_2$, $R_3$ and $R_4$ may be any hydrocarbon group, whether straight chain, branched, or cyclic, whether saturated or unsaturated (aromatic unsaturation or non-benzenoid unsaturation) that is, aliphatic, cycloaliphatic and aromatic, including ethylenically unsaturated groups, among which may be mentioned such important groups as alkyl, aryl, aralkyl, alkaryl, cycloalkyl, alkenyl, and various combinations thereof. $R_1$, $R_3$ and $R_4$ may also be hydrogen. Equivalent to the hydrocarbon groups are the various substituted hydrocarbons, notably those substituted with halogens (e.g., chlorine, bromine), nitro, carboxyl, ether, ester, or similar groups, singly or as multi-substituents (e.g., $R_1$, $R_2$, $R_3$ and/or $R_4$ = 2,5-dichlorophenyl; 3,4-dichlorophenyl; 2-methyl-3,5-dichlorophenyl; 2,4,6-trimethylphenyl; 2,4,6-trichlorophenyl), as will be exemplified in more detail below. Likewise the substitution may be in a carbon chain, for example in a ring to provide a heterocyclic ring, containing one or more of such hetero atoms as nitrogen, oxygen, and sulfur, as will be exemplified below. Thus, there may be mentioned such N-heterocyclic substituted products as those in which $R_1$ = furfuryl, alpha-pyridyl, benzothiazolyl, etc. Other forms of the invention may be provided by joining $R_1$ and $R_2$ and/or $R_3$ and $R_4$ together to form a ring structure, e.g., a morpholido group. If desired one or more of the R's may serve as linkages to another like radical to form a bis compound. These embodiments are of course not exhaustive, and many other variations will be apparent to those skilled in the art.

Preferred chemicals of the invention are those in which $R_1$, $R_3$ and $R_4$ are hydrogen and $R_2$ has one of the other values states, particularly alkyl (especially butyl), aryl (especially phenyl), alkaryl (especially tolyl, particularly o-tolyl and m-tolyl), or cycloalkyl (especially cyclohexyl), or similar hydrocarbon group having up to 12 carbon atoms.

Alk, as used in the above formula, represents an alkyl or a halo or aryl substituted alkyl group. Preferably, the alkyl group has from one to 12 carbon atoms (especially methyl). Ar is an aryl group or a halo or alkyl substituted aryl group. Preferably, the aryl group is phenyl or naphthyl and the substitutions bromo, chloro or lower alkyl.

The compounds of the invention are useful as plant growth regulants and fungicides and may be applied to soil, plants or plant parts for these purposes.

The compounds of the invention may be prepared by the well-known methods of thiazole synthesis, such as the reaction of alpha-halo ketones with thioureas and thioamides. The intermediates for the preparation of the compounds (2-aminothiazole derivatives) (I) are the alpha-chloroacetoacetamides (IV) and the thioureas (V). The alpha-chloroacetoacetamides (IV) are obtained by the chlorination with sulfuryl chloride of the corresponding acetoacetamides (III) which in turn are obtained from ethyl acetoacetate or diketene and primary or secondary amines by standard procedures. Thiourea is commercially available and the unsymmetrically substituted thioureas (V) were obtained by known methods. The synthesis may be represented as follows:

$$CH_3COCH_2CONR_1R_2 + SO_2Cl_2 \longrightarrow CH_3COCHCONR_1R_2$$
$$\qquad\qquad\qquad\qquad\qquad\qquad\qquad\qquad |$$
$$(III) \qquad\qquad\qquad\qquad\qquad\qquad\qquad\qquad Cl$$
$$\qquad\qquad\qquad\qquad\qquad\qquad\qquad\qquad (IV)$$

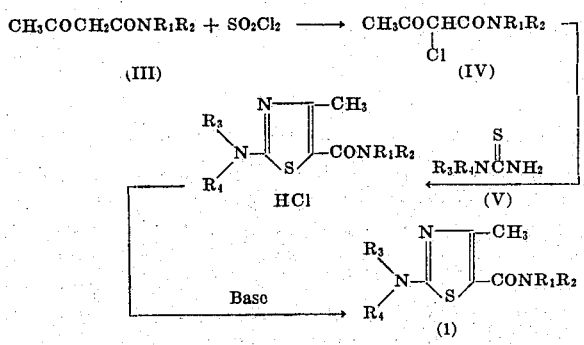

The actual preparation of the 2-aminothiazole derivatives (I) consist of mixing the alpha-chloroacetoacetamide (IV) with the thiourea (V) (excess thiourea may be used) in the presence of a suitable solvent such as water or alcohol and heating the mixture on the steam bath for a short time (15 minutes to 2 hours) followed by basification. The precipitated aminothiazole (I) is filtered off, washed with water and with benzene. The aminothiazoles (I), are insoluble in benzene and this enables their preparation from crude (IV) because the impurities present in (IV) are usually benzene-soluble and may be washed out from the end product.

Alternatively the reaction may be carried out in one step by mixing together III, V, and sulfuryl chloride in benzene or toluene, heating for a short time and then recovering I from its hydrochloride.

The preparation of 2-alkylthiazole derivative (II) consists of mixing an alpha-haloacetoacetamide (VI) with a thioamide (VII) in the presence of a suitable solvent such as alcohol, aqueous alcohol, glycol or water and heating for a short time (15 minutes to 2 hours) followed by basification. The precipitated alkylthiazole (II) is filtered, washed and dried.

$$CH_3COCHCONR_1Ar + \text{Alkyl } CSNH_2 \longrightarrow$$
$$\quad\;\; |$$
$$\quad\;\; Cl$$
$$(VI) \qquad\qquad (VII)$$

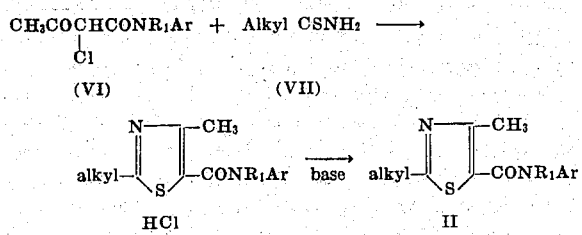

Examples of the preparation of specific compounds of the 2-amino derivatives and the physical properties are set forth below:

EXAMPLE 1

2-Amino-4-methyl-5-carboxanilidothiazole

METHOD A

846 g. of alpha-chloroacetoacetanilide (4 moles), 310 g. of thiourea and 1,400 ml of ethanol were mixed thoroughly at room temperature. An exothermic reaction soon started and solution was virtually complete within a few minutes. The reaction flask was then placed on a steam cone and heated for 15–20 minutes. Precipitation of hydrochloride started almost immediately. The reaction mixture was cooled and the hydrochloride collected by filtration. The hydrochloride was dissolved in warm water and the solution filtered and basified with ammonium hydroxide. The precipitated base was filtered off and dried. The crude product (815 g. 87 percent yield) started to melt at 211° and finally melted with decomposition at 262°. Recrystallization from ethanol gave 692 g. of 2-amino-4-methyl-5-thiazolecarboxanilide which started to melt at 221° or higher. Yield: 74 percent. (The purified base partially melts at 222°–223° and then becomes solid again. Decomposition occurs slowly as the temperature is raised and the final melting point is variable.)

METHOD B

A reaction mixture of alpha-chloroacetoacetanilide (528 g., 2.5 mol), thiourea (190 g., 2.5 ml) and water (1,600 ml) was stirred and heated at 80°–90° until the solid dissolved (about 1 hour). The hot solution was filtered and the filtrate basified with a solution of concentrated ammonium hydroxide (28 to 30 percent) (203 ml) and water (300 ml). The white precipitate was filtered, washed with water and dried. The white product melted at 220°–223° and weighed 526 g. or 90 percent.

EXAMPLE 2

2-Amino-4-methyl-5-m-methylcarboxanilidothia-zole

Sulfuryl chloride (41 g.) was added in portions to a mixture of acetoacet-m-toluidide (57 g.), thiourea (46 g.) and benzene (100 ml.). Cooling was required to control the reaction. After the initial reaction had subsided the mixture was heated for 1 hr. on a steam cone and left overnight at room temperature. Most of the benzene was evaporated from the resulting solid mass under vacuum. The solution which was obtained by treating the solid mass with warm water was filtered and basified with ammonium hydroxide. The precipitated base was collected by filtration and recrystallized from ethanol to give 33 g. or 45 percent of yellow crystals, m.p. 189°–191° and 193°–194° (double melting point).

EXAMPLE 3

2-Amino-4-methyl-5-p-methylcarboxanilidothia-zole

To a stirred suspension of p-methylacetoacetanilide (40 g.) in benzene (200 ml.) was added dropwise sulfuryl chloride (30 g.) over a period of 10 minutes. The temperature was kept at 20°–25°C. by cooling. The resulting solution was stirred at room temperature for 2 hours and then the solvent was distilled off in vacuo at a temperature not greater than 50°C. To the residual crude alpha-chloro-p-methylacetoacetanilide was added a solution of thiourea (25 g.) in water (50 ml.) and ethanol (100 ml.) and the mixture heated under reflux for 15 minutes. The resulting solution was basified with aqueous sodium hydroxide, the white precipitate filtered, washed with water, benzene and ethanol and dried, m.p. 234°–236°C., yield 40 g. or 78 percent. On crystallization from ethanol it melted at 238°–240°C.

EXAMPLE 4

2-Amino-4-methyl-5-o-chlorocarboxanilidothiazole

A solution of sulfuryl chloride (33 g.) in benzene (50 ml.) was added portionwise to a flask containing o-chloroacetoacetanilide (51 g.) and benzene (200 ml.). After the reaction mixture had stood for 2 hrs. at room temperature the benzene was removed under vacuum. To the residue, which crystallized on cooling, was added ethanol (225 ml.) and thiourea (20 g.). After the strongly exothermic reaction had subsided, the mixture was heated for 10 min. on a steam cone. A slurry of the crude hydrochloride in water was treated with aqueous ammonia to liberate the base. The base was recrystallized from ethanol, in which it is only slightly soluble, to give white crystals (55 g. or 86 percent yield) which melted at 258°–259° with decomposition.

EXAMPLE 5

2-Amino-4-methyl-5-N-ethyl-o-methyl-carboxanilidothiazole

To a stirred solution of N-ethyl-o-methylacetoacetanilide (50 g.) in benzene (100 ml.) was added sulfuryl chloride (35 g.) dropwise over 10 minutes keeping the temperature of the reaction mixture at 25° to 30°C. by cooling. The solution was allowed to stand at room temperature for 2 hours and then the solvent was distilled off in vacuo at a temperature not greater than 50°. To the residual crude alpha-chloro-N-ethyl-o-methylacetoacetanilide was added a solution of thiourea (30 g.) in water (60 ml.) and ethanol (60 ml.) and the mixture heated under reflux for 15 minutes. The ethanol was distilled off and the aqueous residue basified with dilute aqueous sodium hydroxide. The white precipitate was filtered, washed with water and with benzene and dried, m.p. 210°–213 °C., yield 40 g. or 80 percent. Crystallization from benzene containing a little methanol yielded sparkling white crystals melting at 219°–222°C.

EXAMPLE 6

2-Amino-4-methyl-5-N-benzylcarboxamidothiazole

To a suspension of N-benzylacetoacetamide (30 g.) in benzene (100 ml.) was added portionwise sulfuryl chloride (23 g. 11 percent excess) over 10 minutes keeping the temperature at 20°–25° by cooling. The resulting solution was allowed to stand at room temperature for 2 hours and then the solvent was removed in vacuo at a temperature not greater than 50°C. To the residual crude alpha-chloro-N-benzylacetoacetamide was added a solution of thiourea (20 g.) in water (50 ml.) and ethanol (50 ml.) and the reaction mixture was heated under reflux for 15 minutes. The ethanol was distilled off, the aqueous residual solution was basified with sodium hydroxide, the white precipitate was filtered, washed with water and with benzene and dried. Crystallization from isopropanol yielded 23 g. or 60 percent of white solid melting at 143°–145°C.

EXAMPLE 7

2-Amino-4-methyl-5-N,N-dimethylcarboxamidothiazole

To a solution of N,N-dimethylacetoacetamide (40 g.) in benzene (100 ml.) was added sulfuryl chloride (45 g.) dropwise over 15 minutes keeping the temperature of the reaction mixture at 20°–25°C. by cooling. The resulting solution was allowed to stand at room temperature for 3 hours and then the solvent was removed in vacuo at a temperature not greater than 50°C. To the residual crude alpha-chloro-N,N-dimethylacetoacetamide was added a solution of thiourea (30 g.) in water (60 ml.) and the solution was heated on the steam bath for 10 minutes. The resulting solution was treated with excess saturated aqueous sodium bicarbonate, the white precipitate filtered, washed with cold water and dried, m.p. 220°–225°C. with decomposition; yield 30 g. or 52 percent. Crystallization from isopropanol raised the melting point to 236°–238°C. with decomposition.

EXAMPLE 8

2-Methylamino-4-methyl-5-carboxanilidothiazole

A mixture of alpha-chloroacetoacetanilide (63.5 g.) methylthiourea (27 g.) and 95 percent ethanol (150 ml.) was heated under reflux for 2.5 hours. The solids dissolved shortly after heating commenced and then a precipitate formed. The reaction mixture was cooled and the precipitated solid filtered off. The solid, the hydrochloride of the desired product, was dissolved in warm water, the solution filtered, and the filtrate made basic with ammonium hydroxide. The precipitated base was collected by filtration, washed with water and dried. The thiazole (48 g. or 65 percent) m.p. 222°–224°, was obtained.

EXAMPLE 9

2-Anilino-4-methyl-5-carboxanilidothiazole alpha-Chloroacetoacetanilide (63.5 g.) phenylthiourea (46 g.) and 95% ethanol (165 ml.) were heated under reflux for 2.5 hours. There was complete solution and no precipitate separated from the hot reaction mixture. When the reaction mixture was allowed to cool, a crystalline precipitate formed which proved not to be a hydrochloride. It was filtered off and recrystallized from ethanol to give 73 g. of greyish white solid, m.p. 189°–191°. Yield: 78 percent.

EXAMPLE 10

This example lists other 2-amino-4-methyl-5-carboxamidothiazoles prepared (Table I). The preparations of compounds 1, 3, 4, 6, 26, 27 and 32 are shown in detail in the previous Examples 1–7, respectively, and are representative of the methods employed for preparing the claimed compounds.

EXAMPLE 11

2,4-Dimethyl-5-carboxanilidothiazole alpha-Chloroacetoacetanilide (211.5 g., 1 mole), thioacetamide (75 g. 1 mole) and ethanol (400 ml.) were heated together under reflux on a steam bath. An exothermic reaction began soon after the mixture started to boil and the reactants were into solution within a few minutes. External heating was briefly interrupted until the exothermic reaction subsided and was then resumed for about 1 hour. When the reaction mixture was cooled, a precipitate of the thiazole hydrochloride formed. The hydrochloride (which can be collected by filtration at this point if desired) was dissolved again by adding some dilute hydrochloric acid and reheating the mixture. A small amount of insoluble material was removed by filtering the solution and the filtrate was basified with dilute ammonium hydroxide. The precipitated thiazole was collected by filtration, washed twice with cold 1:1 ethanol-water and dried. 175 g. (75 percent yield) of the thiazole, mp 138°–145°. was obtained.

EXAMPLE 12

2,4-Dimethyl-5-(o-methoxycarboxanilido)thiazole

A solution of sulfuryl chloride (27 g., 0.2 mole) in benzene (50 ml) was added in portions to acetoacet-o-anisidide (41.4 g., 0.2 mole) in benzene (100 ml). After the mixture had stood for an hour at room temperature the solvent was evaporated under reduced pressure. Ethanol (120 ml) and thioacetamide (16 g., 0.21 mole) was added to the residue and the resulting mixture heated under reflux for 30 minutes. A precipitate formed after about 10 minutes of heating. The reaction mixture was cooled and the precipitate filtered off and dissolved in warm, very dilute hydrochloric acid (about 25 ml of concentrated acid diluted with 750 ml of water). The solution was filtered and the filtrate made basic with ammonium hydroxide. The precipitated thiazole was collected by filtration, washed with water and a small amount of cold ethanol, and dried. The product (33 g., 63 percent yield) melted at 98.5°–101.5°.

EXAMPLE 13

This example lists other 2-alkyl-4-methyl-5-carboxanilidothiazoles prepared (Table II). The preparation of the compounds 1 and 2 are shown in detail in examples 11 and 12 respectively and are representative of the methods employed for preparing the claimed compounds of Table II.

TABLE I.—2-AMINO-4-METHYL-5-CARBOXAMIDOTHIAZOLES $$\underset{H_2N}{\overset{N}{\underset{S}{\bigsqcup}}}\overset{CH_3}{\underset{CONR_1R_2}{}}$$

| Compound | Name of the 5-Substituent | Amine used | $R_1$ | $R_2$ | M.P. | Yield, percent |
|---|---|---|---|---|---|---|
| 1 | Carboxanilido | Aniline | H | $C_6H_5$— | (¹) | 74 |
| 2 | o-Methylcarboxanilido | o-Toluidine | H | o-$CH_3C_6H_4$— | 221–223 | 65 |
| 3 | m-Methylcarboxanilido | m-Toluidine | H | m-$CH_3C_6H_4$— | (¹) | 45 |
| 4 | p-Methylcarboxanilido | p-Toluidine | H | p-$CH_3C_6H_4$— | 236–240 | 78 |
| 5 | o-Ethylcarboxanilido | o-Ethylaniline | H | o-$C_2H_5C_6H_4$— | 198–200 | 29 |
| 6 | o-Chlorocarboxanilido | o-Chloroaniline | H | o-$ClC_6H_4$— | 258–259d | 86 |
| 7 | m-Chlorocarboxanilido | m-Chloroaniline | H | m-$ClC_6H_4$— | 210–214 | 88 |
| 8 | p-Chlorocarboxanilido | p-Chloroaniline | H | p-$ClC_6H_4$— | 258–261d | 95 |
| 9 | p-Bromocarboxanilido | p-Bromoaniline | H | p-$BrC_6H_4$— | 274–275d | 87 |
| 10 | o-Methoxycarboxanilido | o-Anisidine | H | o-$CH_3OC_6H_4$— | 240–242d | 70 |
| 11 | p-Methoxycarboxanilido | p-Anisidone | H | p-$CH_3OC_6H_4$— | 227–229 | 76 |
| 12 | p-Nitrocarboxanilido | p-Nitroaniline | H | p-$NO_2C_6H_4$— | 228–231d | 80 |
| 13 | 2,4-dimethylcarboxanilido | 2,4-dim6thylaniline | H | 2,4-$(CH_3)_2$—$C_6H_3$ | 245–250d | 60 |
| 14 | 2,5-dimethylcarboxanilido | 2,5-dimethylaniline | H | 2,5-$(CH_3)_2$—$C_6H_3$ | 222–225 | 51 |
| 15 | 2-methoxy-5-methylcarboxanilido | 2-methoxy-5-methylaniline | H | 2-$CH_3O$—5-$CH_3C_6H_3$ | 219–222 | 51 |
| 16 | 4-methoxy-2-methylcarboxanilido | 4-methoxy-2-methylaniline | H | 4-$CH_3O$=2=$CH_3C_6H_3$— | 211–215 | 46 |
| 17 | 3,4-dichlorocarboxanilido | 3,4-dichloroaniline | H | 3,4-$Cl_2C_6H_3$— | 248–250d | 69 |
| 18 | 3-chloro-4-methylcarboxanilido | 3-chloro-4-methylaniline | H | 3-Cl-4-$CH_3$—$C_6H_3$ | 221–223 | 78 |
| 19 | 2,4,6-trimethylcarboxanilido | 2,4,6-trimethylaniline | H | 2,4,6-$(CH_3)_3$—$C_6H_2$ | 243–246d | 42 |
| 20 | 2,4,5-trichlorocarboxanilido | 2,4,5-trichloroaniline | H | 2,4,5-$Cl_3$—$C_6H_2$ | 272–275d | 85 |
| 21 | N-α-naphthylcarboxamido | α-Napthylamine | H | $C_{10}H_7$— | 240–242d | 70 |
| 22 | N-α-pyridylcarboxamide | α-aminopyridine | H | 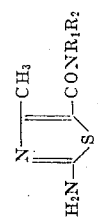 | 213–215 | 45 |
| 23 | N-methylcarboxanilido | N-methylaniline | $CH_3$ | $C_6H_5$— | 176–178d | 55 |
| 24 | N-ethylcarboxanilido | N-ethylaniline | $C_2H_5$ | $C_6H_5$— | 187–190 | 74 |
| 25 | N-β-cyanoethylcarboxanilido | N-β-cyanoethylaniline | $CNCH_2$—$CH_2$ | $C_6H_5$— | 130–132 | 52 |
| 26 | N-ethyl-o-methylcarboxanilido | N-ethyl-o-toluidine | $C_2H_5$ | o-$CH_3C_6H_4$— | 219–222 | 80 |
| 27 | N-benzylcarboxamide | N-benzylamine | H | $C_6H_5CH_2$— | 143–145 | 60 |
| 28 | n-ethylcarboxamide | Ethylamine | H | $C_2H_5$— | 166–168 | 60 |
| 29 | N-n-butylcarboxamide | n-Butylamine | H | $C_4H_9$— | 160–162 | 40 |
| 30 | N-cyclohexylcarboxamide | Cyclohexylamine | H | $C_6H_{11}$— | 238–240 | 55 |
| 31 | p-phenylcarboxanilide | p-phenylaniline | H | p-$C_6H_5$—$C_6H_4$ | 250–251d | 92 |
| 32 | N,N-dimethylcarboxamido | N,N-dimethylamine | $CH_3$ | $CH_3$ | 220–225d | 54 |
| 33 | N,N-diethylcarboxamido | N,N-diethylamine | $C_2H_5$ | $C_2H_5$ | 159–162 | 45 |
| 34 | N,N-diisopropylcarboxamido | N,N-disopropylamine | $C_3H_7$-iso | $C_3H_7$-iso | 236–238 | 43 |
| 35 | N,N-di-n-butylcarboxamido | N,N-di-n-butylamine | n-$C_4H_9$— | n-$C_4H_9$— | 135–136 | 78 |
| 36 | Carboxmorpholido | Morpholine | (¹) | (¹) | 216–218 | 54 |
| 37 | 2,6-diethylcarboxanilido | 2,6-diethylaniline | H | 2,6-$(C_2H_5)_2$—$C_6H_3$ | 206–209 | 60 |
| 38 | o-Carbethoxycarboxanilido | o-Carbethoxyaniline | H | o-$H_2C_2OOC_6H_4$— | 216–218 | 95 |
| 39 | 2-chloro-6-methylcarboxanilido | 2-chloro-6-methylaniline | H | 2-Cl-6-$CH_3C_6H_3$— | 288–290d | 93 |
| 40 | m-Bromocarboxanilido | m-Bromoaniline | H | m-$BrC_6H_4$— | 207–211 | 64 |
| 41 | m-Trifluoromethylcarboxanilido | 3-aminobenzo??rifluoride | H | m-$CF_3$—$C_6H_4$ | 200–202.5 | 69 |
| 42 | 5-chloro-2-methoxycarboxanilido | 5-chloro-2-?????methoxyaniline | H | 5-Cl—2-$CH_3O$—$C_6H_3$ | 249–251d | 96 |
| 43 | 2,6-dimethylcarboxanilido | 2,6-dimethylaniline | H | 2,6—$(CH_3)_2$—$C_6H_3$ | (⁴) | 69 |
| 44 | m-Methoxycarboxanilido | m-Anisidine | H | m-$CH_3O$—$C_6H_4$ | 181–185 | 56 |
| 45 | 3,4-dimethylcarboxanilido | 3,4-dimethylaniline | H | 3,4-$(CH_3)_2$—$C_6H_3$ | 221–224 | 48 |
| 46 | 2,5-dichlorocarboxanilido | 2,5-dichloroaniline | H | 2,5-$Cl_2$—$C_6H_3$ | (¹) | 93 |
| 47 | 2,4-dichlorocarboxanilido | 2,4-dichloroaniline | H | 2,4-$Cl_2$—$C_6H_3$ | 240–242d | 92 |
| 48 | 2,3-dichlorocarboxanilido | 2,3-dichloroaniline | H | 2,3-$Cl_2$—$C_6H_3$ | 261–263d | 79 |
| 49 | 4-chloro-2-methylcarboxanilido | 4-chloro-2-methylaniline | H | 4-Cl-2-$CH_3$—$C_6H_3$ | 210–213 | 57 |
| 50 | 5-chloro-2-methylcarboxanilido | 5-chloro-2-methylaniline | H | 5-Cl-2-$CH_3$—$C_6H_3$ | 233–237d | 78 |
| 51 | N-tert.-butylcarboxamido | t-Butylamine | H | $(CH_3)_3C$— | 194–197 | 45 |
| 52 | 2-thiazolylcarboxamido | 2-aminothiazole | H |  | 245–247d | 20 |

| Compound | Name of the 5-Substituent | Amine used | R₁ | R₂ | M.P. | Yield, percent |
|---|---|---|---|---|---|---|
| 53 | 5-chloro-2,4-dimethoxycarboxanilido | 5-chloro-2,4-dimethoxyaniline | H | 5-Cl-2,4-(CH₃-O)₂-C₆H₂- | 260-262d | 76 |
| 54 | o-Ethoxycarboxanilido | o-Phenetidine | H | o-C₂H₅O-C₆H₄- | 266-268d | 33 |
| 55 | p-Ethoxycarboxanilido | p-Phenetidine | H | p-C₂H₅O-C₆H₄- | 213-214d | 90 |
| 56 | 1,2-ethylene-bis N,N-(2-amino-4-methylcarboxamidothiazole) | Ethylenediamine | |  | 290-295d | 50 |

¹ Double M.P. 222-224 and 270-285 decomp. (variable).
² Double M.P. 189-191, 193-194.
³ R₂ and R₁ together equal 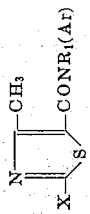
⁴ Double M.P. 249-251, 275d.
⁵ 252 (partial) 271d.

TABLE II.—2-ALKYL-4-METHYL-5-CARBOXANILIDOTHIAZOLES

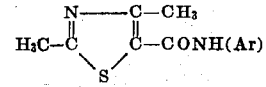

| Name of the 5-substituent | Amine Used | Thioamide used | X | R₁ | Ar | M.P., °C. | Yield, percent |
|---|---|---|---|---|---|---|---|
| 1 Carboxanilido | Aniline | Thioacetamide | CH₃ | H | C₆H₅- | 139-141.5 | 75 |
| 2 o-Methoxycarboxanilido | o-Anisidine | do | CH₃ | H | o-CH₃O-C₆H₄- | 98.5-101.5 | 63 |
| 3 o-Methylcarboxanilido | o-Toluidine | do | CH₃ | H | o-CH₃-C₆H₄- | 124-126 | 46 |
| 4 p-Chlorocarboxanilido | p-Chloroaniline | do | CH₃ | H | p-Cl-C₆H₄- | 153-157 | 40 |
| 5 Carboxanilido | Aniline | Thiobutyramide | CH₃-(CH₂)₂- | H | C₆H₅- | 130-135 | 22 |

The compounds of the instant invention are useful fungicides and plant growth regulators. They may be applied according to the conventional practice as is well known in the art.

Having thus described our invention, what we claim and desire to protect by Letters Patent is:

1. A compound having the formula:

$$\begin{array}{c} N \text{———} C\text{—}CH_3 \\ H_3C\text{—}C \quad\quad C\text{—}CONH(Ar) \\ \diagdown S \diagup \end{array}$$

wherein Ar is a phenyl or a naphthyl group, or a substituted phenyl or substituted naphthyl group wherein the substituents are selected from the group consisting of phenyl, methoxy, bromo, chloro, iodo and alkyl containing one to 12 carbon atoms.

2. The compound of claim 1, wherein the compound is 2,4-dimethyl-5-carboxanilidothiazole.

3. The compound of claim 1, wherein the compound is 2,4-dimethyl-5-o-methylcarboxanilidothiazole.

* * * * *